Feb. 10, 1925.
A. H. LAKEMAN
1,525,869
SADDLE FOR CYCLES AND OTHER VEHICLES
Filed April 30, 1924   2 Sheets-Sheet 1
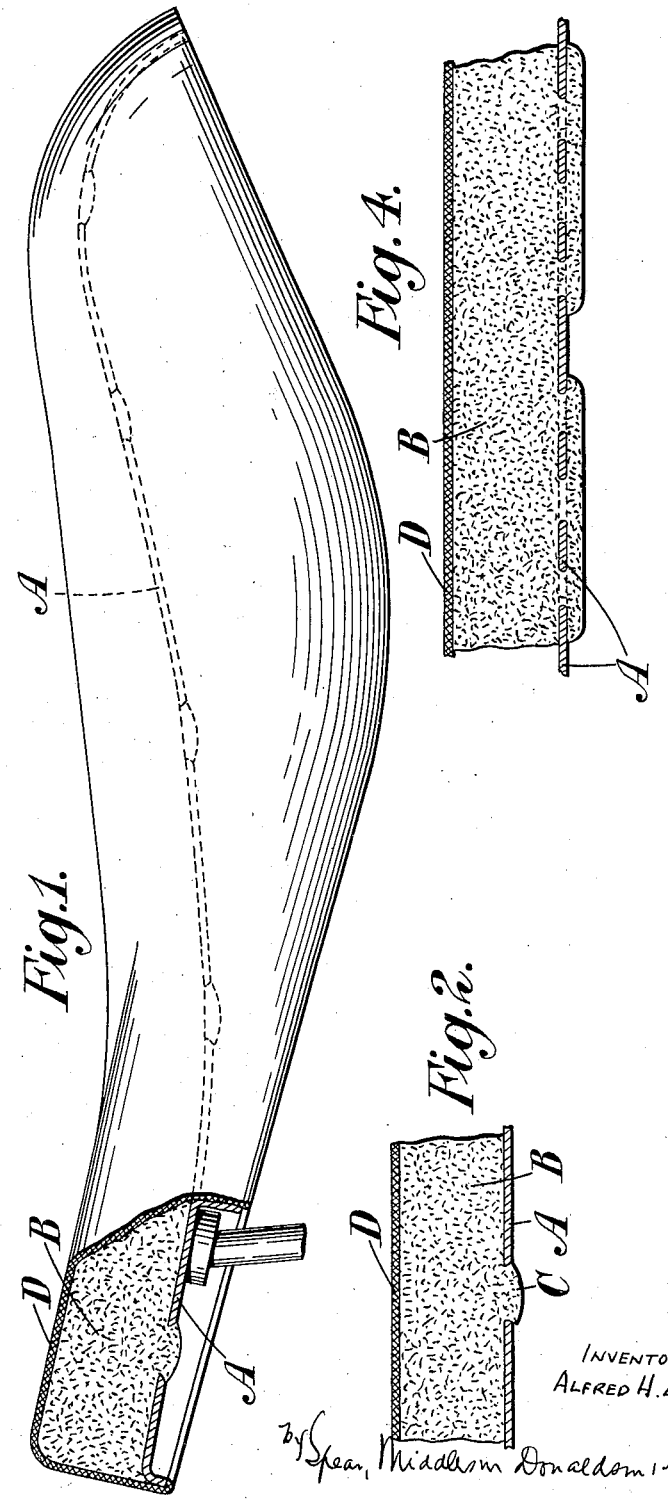
INVENTOR:
ALFRED H. LAKEMAN

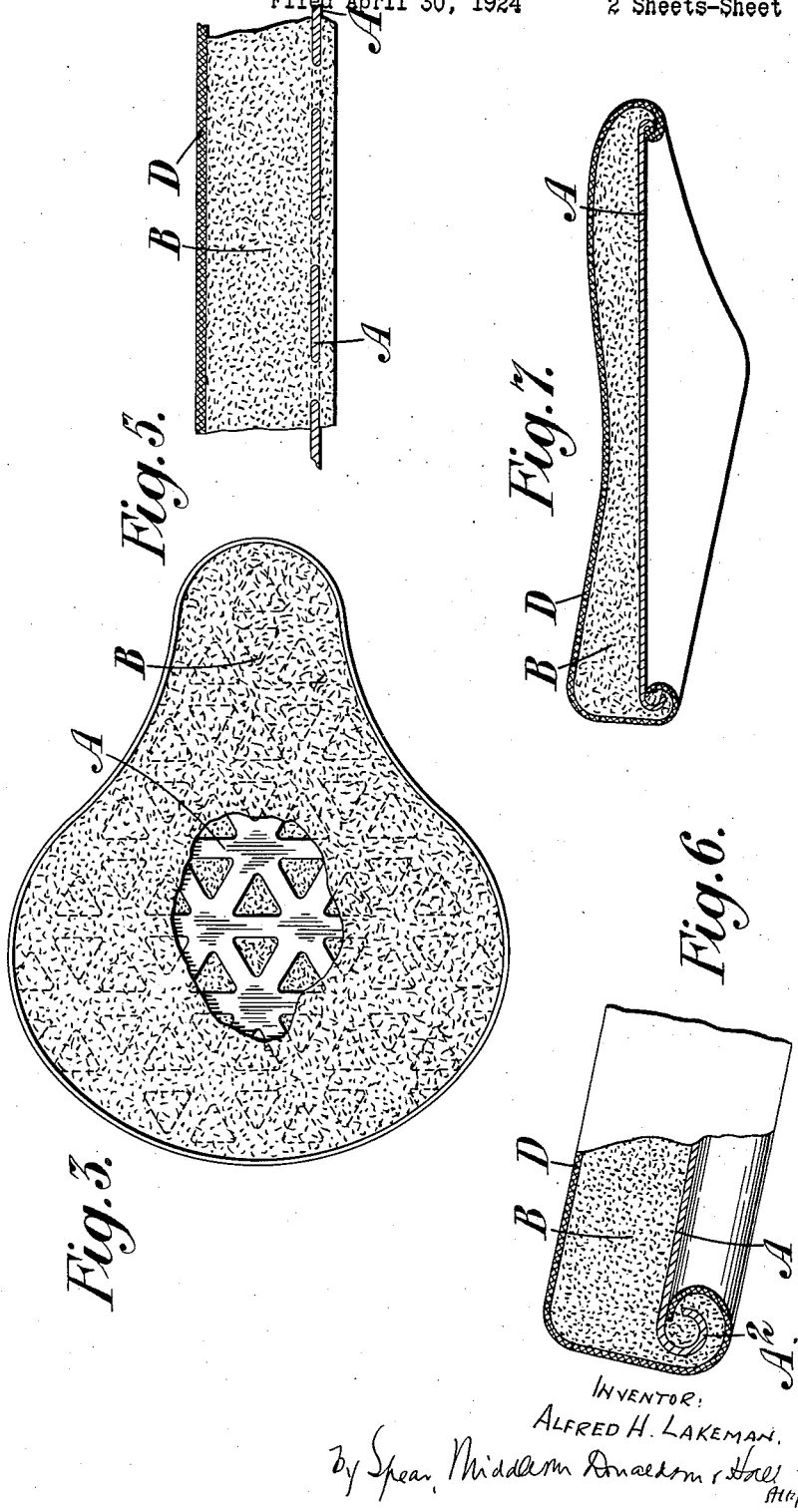

Patented Feb. 10, 1925.

1,525,869

UNITED STATES PATENT OFFICE.

ALFRED HARRY LAKEMAN, OF LONDON, ENGLAND.

SADDLE FOR CYCLES AND OTHER VEHICLES.

Application filed April 30, 1924. Serial No. 710,061.

*To all whom it may concern:*

Be it known that I, ALFRED HARRY LAKEMAN, a subject of the King of England, residing at London, England, have invented certain new and useful Improvements in Saddles for Cycles and Other Vehicles, of which the following is a specification.

This invention relates to saddles and the like for use on motor cycles and other vehicles, of the kind comprising a foundation plate covered with sponge rubber. The sponge rubber is usually packed into casings or is secured by mechanical means to the foundation plate though it has been suggested to cement the sponge rubber to the plate.

The present invention has for its object to produce a simple construction which will be cheap to manufacture and wherein the surface layer of the sponge rubber will not peel off or deteriorate.

According to this invention, the saddle has a sponge rubber core mounted upon a suitable foundation and a rubber surface or covering vulcanized to the core.

In the accompanying drawings,

Figure 1 is a side elevation, partly broken away, showing one method of carrying out the invention as applied to a motor-cycle saddle.

Figure 2 is a sectional view of part of the same.

Figure 3 is an inverted plan of part showing a modification, whilst

Figures 4 and 5 are partial cross sectional views showing further modifications.

Figure 6 is a partial view chiefly in section, and

Figure 7 is a longitudinal section of a modification.

Like letters indicate like parts throughout the drawings.

In the construction shown in Figures 1 and 2, which is particularly intended for the saddle of a motor or other cycle, the foundation or pan A of the saddle is formed of sheet metal pressed into a contoured shape substantially corresponding with the usual contour of a saddle and flanged where desirable around its edges to give the necessary stiffness. It is also provided with means for attaching it through spring or other supports to the cycle frame. On the upper surface of this foundation is spread a layer B of sponge rubber or an equivalent resilient vulcanizable material. This material forms a core and may be moulded upon the foundation A and vulcanized or otherwise cemented to it. To ensure a very secure connection between the two elements, holes C may be drilled at various parts of the foundation so that the resilient material may fill these holes and thereby, as it were, be keyed to the foundation (see particularly Figure 2).

If preferred, the perforations may be regularly arranged in triangular diamond shape to give a lattice-like structure to the foundation (see Figure 3) which will ensure a more intimate union with it of the spongy material. Alternatively, some portions of the lattice-work, or the whole of it, may be entirely embedded in the resilient material, thereby effectually keying them together (see Figures 4 and 5).

Upon the outside of the resilient material is provided a covering D of heavier rubber (which may be sheet rubber coloured and moulded to imitate leather or the like) which is vulcanized to the core B.

As an alternative to the use of rubber only for the outer covering, rubberized fabric or any other material may be employed, which can be vulcanized to the core so that the whole may be vulcanized in one operation. The sponge rubber core is also preferably vulcanized to the foundation in the same operation, but this is not essential. It will be apparent, however, that by the use of rubber for the outer covering D, the saddle is made perfectly waterproof and there is no risk of deterioration as may occur with leather.

In the modification shown in Figure 6, the pan A, which may be perforated or not, is formed with a rolled-over edge $A^2$, and the edge of the core B and the edge of the surfacing material D pass under and inside the rolled-over edge $A^2$, as shown, and are secured thereto by the process of vulcanization.

In the alternative construction shown in Figure 7, the pan or foundation A is flat instead of contoured as shown in Figure 1, and the sponge rubber core B is of varying thicknesses so as to impart the desired shape to the surface of the saddle.

The invention thus provides a very simple and reliable form of saddle, which is extremely comfortable in use, is not affected by water, and is suitable for all classes of vehicles, particularly motor tractors or traction engines where the vehicle springing is of an indifferent nature.

What I claim as my invention and desire to secure by Letters Patent of the United States is:—

1. In a saddle the combination of a foundation plate, a sponge rubber core mounted thereon and a covering of rubber vulcanized to the core.

2. In a saddle the combination of a perforated foundation plate, a sponge rubber core mounted thereon and projecting through said perforations, and a covering of rubber which is vulcanized to the core.

In testimony whereof I have signed my name to this specification in the presence of two subscribing witnesses.

ALFRED HARRY LAKEMAN.

Witnesses:
R. E. SUGAR,
M. LIVINGSTON.